United States Patent
Takeda et al.

(10) Patent No.: US 10,025,719 B2
(45) Date of Patent: Jul. 17, 2018

(54) CACHE MEMORY SYSTEM AND PROCESSOR SYSTEM

(71) Applicant: KABUSHIKI KAISHA TOSHIBA, Tokyo (JP)

(72) Inventors: Susumu Takeda, Kanagawa (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 15/243,196

(22) Filed: Aug. 22, 2016

(65) Prior Publication Data

US 2016/0357683 A1    Dec. 8, 2016

Related U.S. Application Data

(63) Continuation of application No. PCT/JP2015/055245, filed on Feb. 24, 2015.

(30) Foreign Application Priority Data

Feb. 24, 2014   (JP) ................. 2014-033187

(51) Int. Cl.
   *G06F 12/0895*   (2016.01)
   *G06F 12/0897*   (2016.01)
   (Continued)

(52) U.S. Cl.
   CPC ...... *G06F 12/0895* (2013.01); *G06F 12/0897* (2013.01); *G06F 12/1009* (2013.01);
   (Continued)

(58) Field of Classification Search
   None
   See application file for complete search history.

(56) References Cited

U.S. PATENT DOCUMENTS 5,233,700 A    8/1993   Takagi
2003/0191894 A1*   10/2003   Hayter ............... G06F 12/0888
                                                                711/118
(Continued)

FOREIGN PATENT DOCUMENTS

JP    63-214852    9/1988
JP    1-311343    12/1989
(Continued)

OTHER PUBLICATIONS

English-language International Preliminary Report on Patentability from the International Bureau of WIPO for International Application No. PCT/JP2015/055245, dated Aug. 30, 2016.
(Continued)

*Primary Examiner* — Denise Tran
(74) *Attorney, Agent, or Firm* — Finnegan, Henderson, Farabow, Garrett & Dunner, L.L.P.

(57) ABSTRACT

A cache memory system includes cache memories of at least one layer, at least one of the cache memories having a data cache to store data and a tag to store an address of data stored in the data cache, and a first address conversion information storage to store entry information that includes address conversion information for virtual addresses issued by a processor to physical addresses and cache presence information that indicates whether data corresponding to the converted physical address is stored in a specific cache memory of at least one layer among the cache memories.

18 Claims, 6 Drawing Sheets

(51) Int. Cl.
  *G06F 12/1027* (2016.01)
  *G06F 12/1009* (2016.01)
  *G06F 12/1045* (2016.01)

(52) U.S. Cl.
  CPC ...... *G06F 12/1027* (2013.01); *G06F 12/1045* (2013.01); *G06F 2212/1016* (2013.01); *G06F 2212/1028* (2013.01); *G06F 2212/271* (2013.01); *G06F 2212/507* (2013.01)

(56) References Cited

U.S. PATENT DOCUMENTS

2008/0114940 A1   5/2008   Ito
2016/0147666 A1*  5/2016   Li .................. G06F 12/0897
                                                  711/122

FOREIGN PATENT DOCUMENTS

JP        3-232034      10/1991
JP        2001-256108    9/2001
WO    WO 2006/038258    4/2006

OTHER PUBLICATIONS

Written Opinion of the International Searching Authority for International Application No. PCT/JP2015/055245, dated Apr. 21, 2015.
International Search Report from the Japanese Patent Office for International Application No. PCT/JP2015/055245, dated Apr. 21, 2015.
El-Nacouzi et al.; "A Dual Grain Hit-Miss Detector for Large Die-Stacked DRAM Caches", 4 sheets, (2013).
Loh et al.; "Supporting Very Large DRAM Caches with Compound-Access Scheduling and Missmap", IEEE Computer Society, pp. 70-78, (2012).

* cited by examiner

CACHE MEMORY SYSTEM AND PROCESSOR SYSTEM

CROSS REFERENCE TO RELATED APPLICATIONS

This application is based upon and claims the benefit of priority from the prior Japanese Patent Application No. 2014-33187, filed on Feb. 24, 2014, the entire contents of which are incorporated herein by reference.

FIELD

Embodiments of the present invention relate to a cache memory system and a processor system.

BACKGROUND

As referred to as a memory wall problem, memory access is a bottleneck in performance and power consumption of processor cores. In order to mitigate this problem, processors having large-capacity cache memories built near a main memory have become widespread with the advancement of memory techniques as a technical background.

In large-capacity cache memories, with increase in stored data amount, tag memories require larger capacity, which store meta information, namely, address information, on data stored in the cache memories. With the increased capacity, latency of the tag memories increases. In some cases, the latency of tag memories of large-capacity cache memories becomes the same degree as the latency of upper-layer cache memories. In such a case, it cannot be disregarded that the latency of tag memories affects the overall performance of a processor system.

The present embodiment provides a cache memory system including:

cache memories of at least one layer, each cache memory having a data cache to store data and a tag section to store an address of each data stored in the data cache; and a translation lookaside buffer to store page entry information that includes address conversion information for virtual addresses issued by a processor to physical addresses and cache presence information that indicates whether data corresponding to each converted physical address is stored in a specific cache memory of at least one layer.

DETAILED DESCRIPTION

According to one embodiment, a cache memory system includes cache memories of at least one layer, at least one of the cache memories having a data cache to store data and a tag to store an address of data stored in the data cache, and a first address conversion information storage to store entry information that includes address conversion information for virtual addresses issued by a processor to physical addresses and cache presence information that indicates whether data corresponding to the converted physical address is stored in a specific cache memory of at least one layer among the cache memories.

Figure 1:
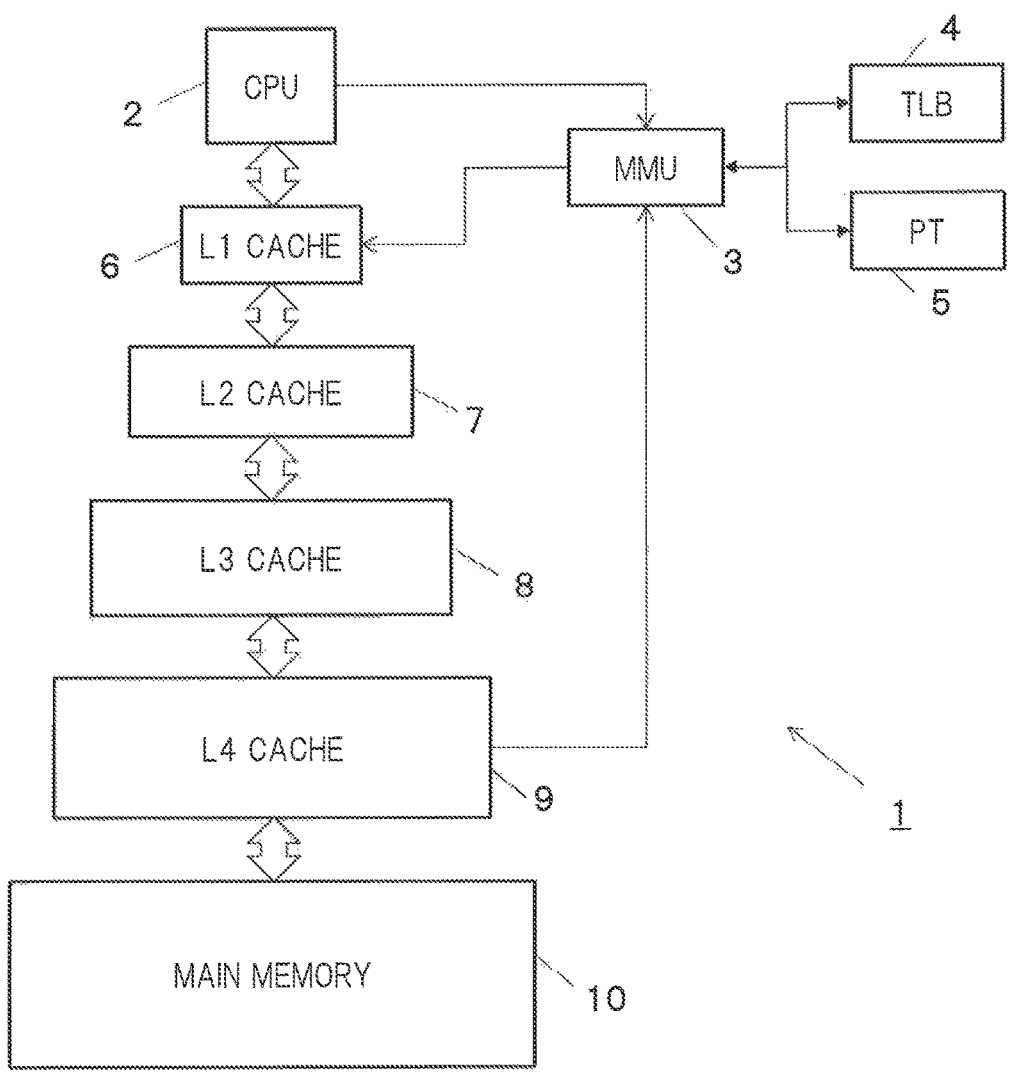
FIG. 1 is a block diagram schematically showing the configuration of a processor system 1 according to an embodiment.

Hereinafter, embodiments of the present invention will be explained with reference to the drawings. FIG. 1 is a block diagram schematically showing the configuration of a processor system 1 according to an embodiment. The processor system 1 of FIG. 1 is provided with a processor (CPU) 2, a memory management unit (MMU) 3, a translation lookaside buffer (TLB, first address conversion information storage) 4, a page table (second address conversion information storage) 5, a first-level cache memory (L1-cache) 6, a second-level cache memory (L2-cache) 7, a third-level cache memory (L3-cache) 8, and a fourth-level cache memory (L4-cache) 9.

At least parts of data stored in a main memory 10 or to be stored therein are stored in the L1- to L4-caches 6 to 9. The caches 6 to 9 have tag units of address information with which data stored in the caches are identifiable. There are a variety of configurations for the tag units to store the address information. For example, the tag units may have dedicated memory areas or may store the address information in a part of data memory areas. The present embodiment can be combined with all of these configurations.

The processor 2, the MMU 3, the L1-cache 6, the L2-cache 7, the L3-cache 8, and the L4-cache 9, other than the main memory 10, are, for example, integrated in one chip. For example, a system may be structured in the following manner. The processor 2, the MMU 3, the L1-cache 6, the L2-cache 7, and the L3-cache 8 are integrated into one chip. The L4-cache 9 is integrated into another chip. The chips are directly connected to each other by metal wirings based on the chips' integrated structures. In the present embodiment, a system having the MMU 3 and the L1- to L4-caches 6 to 9 are referred to as a cache system.

The L1- to L4-caches 6 to 9 have semiconductor memories accessible at higher speeds than the main memory 10. There are variations in policy of data allocation to the caches. One mode is, for example, an inclusion type. In this case, all of data stored in the L1-cache 6 are stored in the L2-cache 7, all of data stored in the L2-cache 7 are stored in the L3-cache 8, and all of data stored in the L3-cache 8 are stored in the L4-cache 9.

Another mode is, for example, an exclusion type. In this mode, the same data is not allocated for example, to the L1-cache 6 and the L2-cache 7. A further mode is a hybrid method of, for example, an inclusion & exclusion type. In this policy, there are duplicate data stored, for example, in the L1-cache 6 and the L2-cache 7, and also there are data exclusively stored therein.

These modes are a policy of data allocation between two caches. There are a variety of combinations in a multi-layered cache configuration. For example, the inclusion type may be used in all layers. For example, the exclusion type may be used in the L1- and L2-caches 6 and 7, and the inclusion type may be used in the L2- and L3-caches 6 and 8. In the method of the present embodiment, a variety of data allocation policies listed above may be combined.

There are a variety of cache updating methods. Any one of them can be combined into the present embodiment. For example, write-through or write-back may be used in writing to a cache in the case of a write hit in the cache. For example, write-allocate or no-write-allocate may be used in writing to a cache in the case of a write miss in the cache.

The L2-cache 7 has a memory capacity equal to or larger than that of the L1-cache 6. The L3-cache 8 has a memory capacity equal to or larger than that of the L2-cache 7. The L4-cache 9 has a memory capacity equal to or larger than that of the L3-cache 8. Accordingly, higher-level cache memories have a larger memory capacity. It is therefore desirable, for higher-level cache memories, to use a highly-integrated memory having a smaller leakage power which tends to be in proportion to the memory capacity. One type of such memory is, for example, a non-volatile memory such as an MRAM (Magnetoresistive Random Access Memory).

The page table 5 stores mapped OS-managed virtual-address and physical-address spaces. In general, virtual addresses are used as an index. The page table 5 has an area for storing physical addresses corresponding to respective virtual addresses, and the like. An area in the page table 5, which corresponds to one virtual address, is referred to as a page entry. Page entries are generally allocated in the main memory space.

The TLB 4 is a memory area for caching a part of the page entries in the page table 5. The TLB 4 is generally installed in the form of hardware, which is accessible at a higher speed than a page table installed in the form of software.

The MMU 3 manages the TLB 4 and the page table 5, with a variety of functions, such as, an address conversion (virtual storage management) to convert a virtual address issued by the processor 2 to a physical address, a memory protection function, a cache control function, a bus arbitration function, etc. Upper-layer caches such as the L1-cache 6 may be accessed with a virtual address. In general, lower-layer caches such as the L2-cache 7 and the further lower-layer caches are accessed with a physical address converted by the MMU 3. The MMU 3 updates a virtual-physical address conversion table in the case of, at least, either data allocation (data writing) to or data flush out from the main memory 10. The MMU 3 can be configured in a variety of form, such as, in the form of hardware entirely, software entirely or a hybrid of hardware and software. Any of the forms can be used in the present embodiment.

In FIG. 1, the TLB 4 is provided apart from the MMU 3. However, the TLB 4 is generally built in the MMU 3. Although in the present embodiment, the MMU 3 and the TLB 4 are treated apart from each other, the TLB 4 may be built in the MMU 3.

The main memory 10 has a larger memory capacity than each of the L1- to L4-caches 6 to 9. Therefore, the main memory 10 is mostly built in one or more chips apart from a chip in which the processor 2 and the like are built. Memory cells of the main memory 10 are, for example, DRAM (Dynamic RAM) cells, MRAM cells, etc. These memory cells may be built in one chip with the processor 2 and the like by the technique of TSV (Through Silicon Via) or the like.

Figure 2:
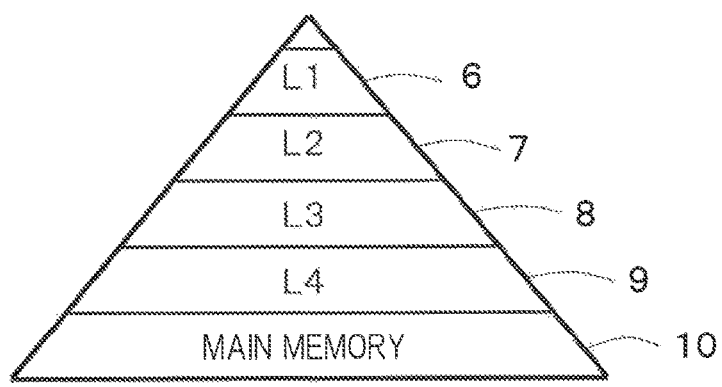
FIG. 2 is a diagram showing access priority to cache memories 4 to 6 and a main memory 10 in a first embodiment.

FIG. 2 is diagram showing access priority to the cache memories 4 to 6 and the main memory 10 in a first embodiment. As shown, a physical address corresponding to a virtual address issued by the processor 2 is sent to the L1-cache 6 at a top priority. If data (hereinafter, target data) corresponding to the physical address is present in the L1-cache 6, the data is sent to the processor 2. The L1-cache 6 has a memory capacity of, for example, about several 10 bytes.

If the target data is not present in the L1-cache 6, the corresponding physical address is sent to the L2-cache 7. If the target data is present in the L2-cache 7, the data is stored in the L1-cache 6 and sent to the processor 2. The L2-cache 7 has a memory capacity of, for example, about several 100 kilobytes to several megabytes.

If the target data is not present in the L2-cache 7, the corresponding physical address is sent to the L3-cache 8. If the target data is present in the L3-cache 8, the data is stored in the L2-cache 7 and the L1-cache 6, and sent to the processor 2. The L3-cache 8 has a memory capacity of, for example, about several megabytes to several 10 megabytes.

If the target data is not present in the L3-cache 8, the corresponding physical address is sent to the L4-cache 9. If the target data is present in the L4-cache 9, the data is stored in the L1- to L3-caches 6 to 8 and sent to the processor 2. The L4-cache 9 has a memory capacity of, for example, several 100 megabytes or more.

The above data transfer method among the cache memories 6 to 9 is just an example. A variety of data transfer methods can be combined into the present embodiment. One data transfer method which can be combined into the present embodiment is, for example, that, if there is a hit in the L4-cache 9, data is stored only in the L1-cache 6 without being stored in the L2- and L3-caches 7 and 8.

If the target data is not present in the L4-cache 9, the corresponding physical address is sent to the main memory 10. It is a precondition in the present embodiment that all data stored in the L4-cache 9 have been stored in the main memory 10. The present embodiment is not limited to the in-between-caches data allocation policy described above. Data stored in the main memory 10 are per-page data managed by the MMU 3. In general, per-page data managed by the MMU 3 are allocated in the main memory 10 and an auxiliary memory device. However, in the present embodiment, all of those data are allocated in the main memory 10, for convenience. In the present embodiment, if the target data is present in the main memory 10, the data is stored in the L1- to L4-caches 6 to 9 and sent to the processor 2. The main memory 10 has a memory capacity of, for example, about several gigabytes.

As described above, the L1- to L4-caches 6 to 9 are layered. A higher-level (lower-layer) cache memory has a larger memory capacity. In the present embodiment, all data stored in a lower-level (upper-layer) cache memory are stored in a higher-level cache memory.

Figure 3:
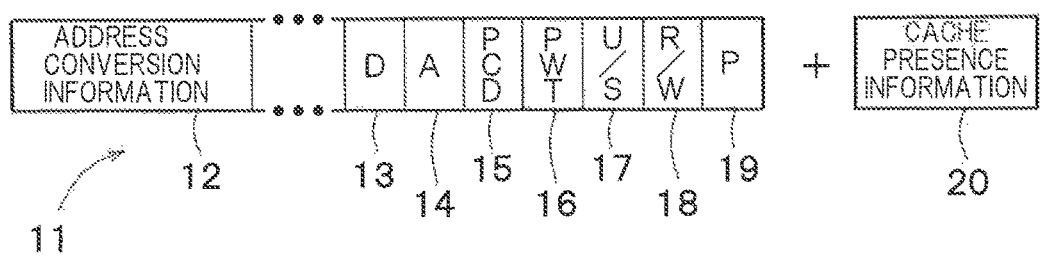
FIG. 3 is a diagram showing an example of the internal configuration of a TLB 4.

FIG. 3 is a diagram showing an example of the internal configuration of the TLB 4. The TLB 4 manages several types of information for each page. Here, one page is data of four kilobytes, for example.

FIG. 3 shows an example of page entry information 11 for one page. The page entry information 11 of FIG. 3 has address conversion information 12, a dirty bit 13, an access bit 14, a page-cache disable bit 15, a page write-through bit 16, a user supervisor bit 17, a read/write bit 18, and a presence bit 19. In addition, the page entry information 11 has cache presence information 20.

The order of the several types of information allocated in the page entry is just an example. The present embodiment is not limited to this order. It is supposed that the present embodiment is applied to an existing processor (in the case of adding cache presence information to an existing page table). In this case, there are a method of storing cache presence information in an empty area of an existing page entry and a method of extending an existing page entry (increasing a bit width).

There are three options for the destination to which page entries including cache presence information are allocated, which are the TLB 4 only, the page table 5 only, and both of the TLB 4 and page table 5. These three options can be combined with the above two methods "addition of cache presence information to an existing page entry" and "extension of an existing page entry".

In the case of allocating the cache presence information to both of the TLB 4 and the page table 5, it is preferable that the page table 5 has page entry information 11 having the same internal configuration as that of the TLB 4. The TLB 4 stores address conversion information on a virtual address recently issued by the processor 2. On the other hand, the page table 5 stores address conversion information on the entire main memory 10. Therefore, even if the TLB 4 has no page entry information 11 on a virtual address issued by the processor 2, cache presence information 20 stored in the corresponding page entry information 11 can be acquired by looking up to the page table 5. When flushing out at least a part of the page entry information 11 in the TLB 4, it is preferable to write-back the page entry information 11 to be flushed out and the corresponding cache presence information 20, to the page table 5. In this way, the page table 5 can store cache presence information 20 corresponding to the page entry information 11 that cannot be stored in the TLB 4.

One example shown in the present embodiment is a method for storing the cache presence information 20 in both of the TLB 4 and the page table 5. It is supposed that the cache presence information 20 is added to an existing page entry. It is also supposed that the existing page entry has an enough empty area for adding the cache presence information 20.

The address conversion information 12 is information for converting a virtual address issued by the processor 2 into a physical address. The address conversion information 12 is, for example, a physical address corresponding to a logical address, a pointer to the page table 5 having a layered configuration, etc. The dirty bit 13 is set to 1 when writing is made to a page in the page table 5. The access bit 14 is set to 1 when access is made to this page. The page cache disable bit 15 is set to 1 when caching to this page is inhibited. The page write-through bit 16 is set to 0 when write-through is made and to 1 when write-back is made. The write-through is defined to write data in both of a cache memory and the main memory 10. The write-back is defined to write data in a cache memory and then write the data back to the main memory 10. The user supervisor bit 17 sets a user mode or a supervisor mode for use of the page mentioned above. The read/write bit 18 is set to 0 in the case of reading only and to 1 in the case of reading and writing. The presence bit 19 is set to 1 when the page mentioned above is present in the main memory 10.

The cache presence information 20 indicates whether data of a physical address corresponding to a virtual address issued by the processor 2 has been stored in a specific cache memory of at least one layer higher. One page has, for example, 4 kbytes, with 64 bytes for each cache line. Therefore, cache presence information 20 per page includes cache presence information 20 for 64=4 k/64 bytes cache lines.

Cache presence information 20 for one cache line is expressed with, for example, one bit. This bit is set to, for example, 1 when data corresponding to a virtual address issued by the processor 2 has been stored in a specific cache memory. It is set to, for example, 0 when the data has not been stored in the specific cache memory.

One example explained below is to provide cache presence information 20 corresponding to the L4-cache 9. However, the target cache may be of any layer. It may, for example, be L2. Moreover, cache presence information 20 corresponding to the L3-cache 8 may be provided.

The MMU 3 looks up to the TLB 4 to convert a virtual address issued by the processor 2 into a physical address and acquires the cache presence information 20 to determine whether data corresponding to the virtual address has been stored in the L4-cache 9. If it is found by the MMU 3 that the data has not been stored in the L4-cache 9, access is made to the main memory 10 without accessing the L4-cache 9 when there is a miss in the L3-cache 8.

Figure 4:
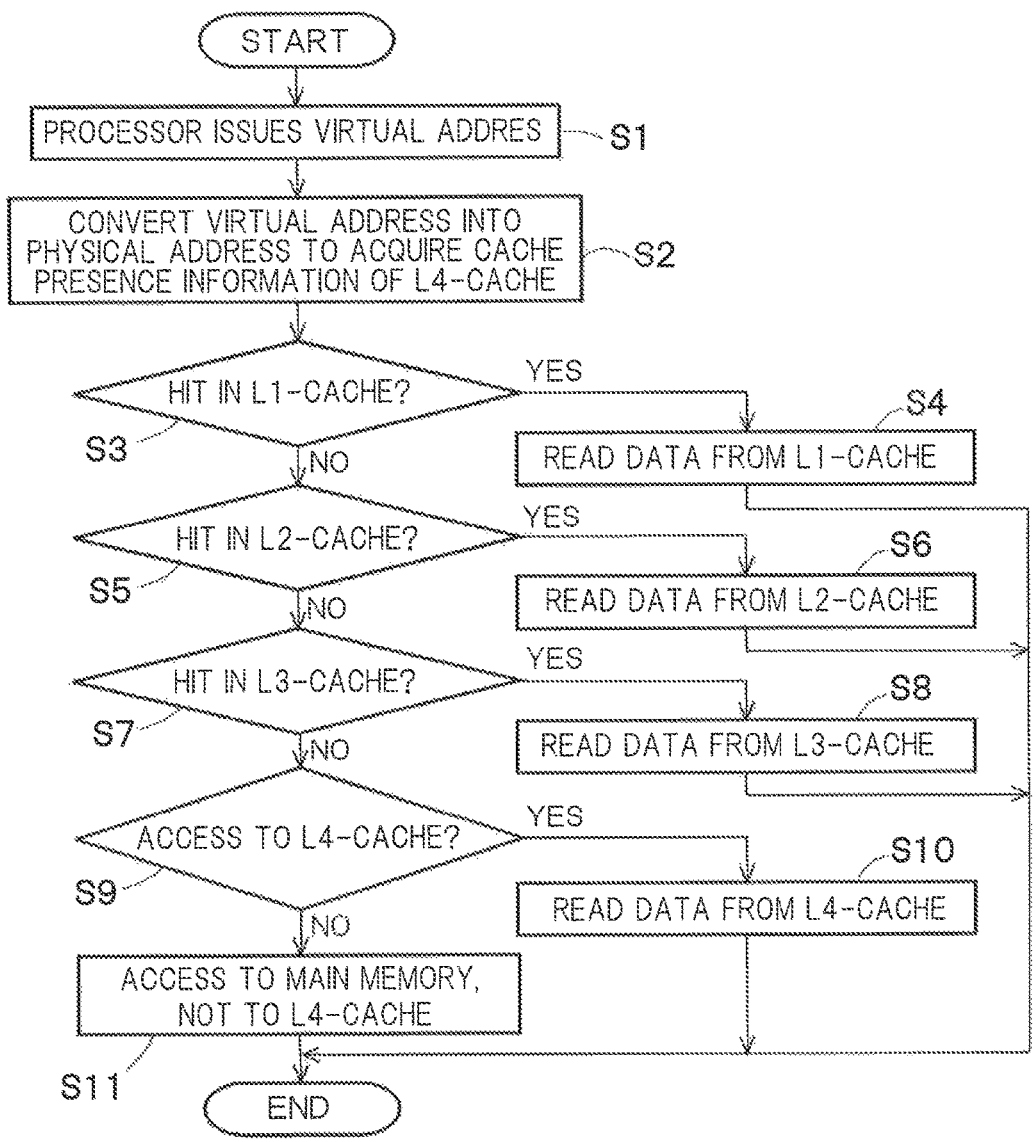
FIG. 4 is a flow chart indicating an operation of the processor system 1 in the present embodiment.

FIG. 4 is a flow chart indicating an operation of the processor system 1 in the present embodiment. This flow chart indicates a procedure in the case where there is a data read request from the processor 2.

When the processor 2 issues a virtual address (Step S1), the MMU 3 looks up to the TLB 4 to convert the virtual address into a physical address and acquires the cache presence information 20 of the L4-cache 9 (Step S2). The reason why the cache presence information 20 of the L4-cache 9 is acquired even though the L1-cache 6 has not been accessed yet is that, if the cache presence information 20 is acquired after there is a miss in the L3-cache 8, the timing of determining whether to access the L4-cache 9 is delayed. There is an advantage that, by accessing the cache presence information simultaneously with the conversion from virtual addresses to physical addresses, the number of times of access to the TLB 4 and the page table 5 can be reduced. One option in the present embodiment is to acquire the cache presence information 20, not at the time of conversion from virtual addresses to physical addresses, but at any timing before accessing the L4-cache 9. For example, the cache presence information 20 may be acquired when there is a miss in the L3-cache 8.

Subsequently, the physical address converted in Step S2 is used to access the L1-cache 6 to look up to a tag memory of the L1-cache 6, to perform hit/miss determination (Step S3).

When there is a hit in the L1-cache 6, the corresponding data is read from the L1-cache 6 and sent to the processor 2 (Step S4). When there is a miss in the L1-cache 6, the physical address converted in Step S2 is used to access the L2-cache 7 to look up to a tag memory of the L2-cache 7, to perform hit/miss determination (Step S5).

When there is a hit in the L2-cache 7, data corresponding to the hit physical address is read from the L2-cache 7 and stored in the L1-cache 6, and sent to the processor 2 (Step S6). When there is a miss in the L2-cache 7, the physical address converted in Step S2 is used to access the L3-cache 8 to look up to a tag memory of the L3-cache 8, to perform hit/miss determination (Step S7).

When there is a hit in the L3-cache 8, data corresponding to the hit physical address is read from the L3-cache 8 and stored in the L2- and L1-caches 7 and 6, and sent to the processor 2 (Step S8).

When there is a miss in the L3-cache 8, the cache presence information 20 acquired in Step S2 is looked up to, to determine whether the possibility of a hit in the L4-cache 9 is high (Step S9). In other words, in Step S9, it is determined whether to access the L4-cache 9 using the cache presence information 20. When it is found in Step S9 that there is a high possibility of a hit in the L4-cache 9, access is made to the L4-cache 9 (Step S10). In this case, the same processing as a regular process for accessing the L4-cache 9 is performed. In other words, access is made to a tag memory of the L4-cache 9 to make hit/miss determination, and if there is a hit, target data is read from a data cache section of the L4-cache 9.

When it is found that there is a high possibility of a miss in the L4-cache 9 as a result of looking up to the cache presence information 20, access is made to the main memory 10 without accessing the L4-cache 9 (Step S11). In this way, access to the main memory 10 can be made at a high speed with no time lag from the access to a tag memory of the L4-cache 9 to the output of a hit/miss determination result.

When at least a part of data in the L4-cache 9 is updated, the MMU 3 also updates the cache presence information 20 about cache lines of the updated data. The timings of updating the cache presence information 20 shown in FIG. 3 are the timing of storing data in the L4-cache 9 and the timing of flushing out data from the L4-cache 9.

Figure 5:
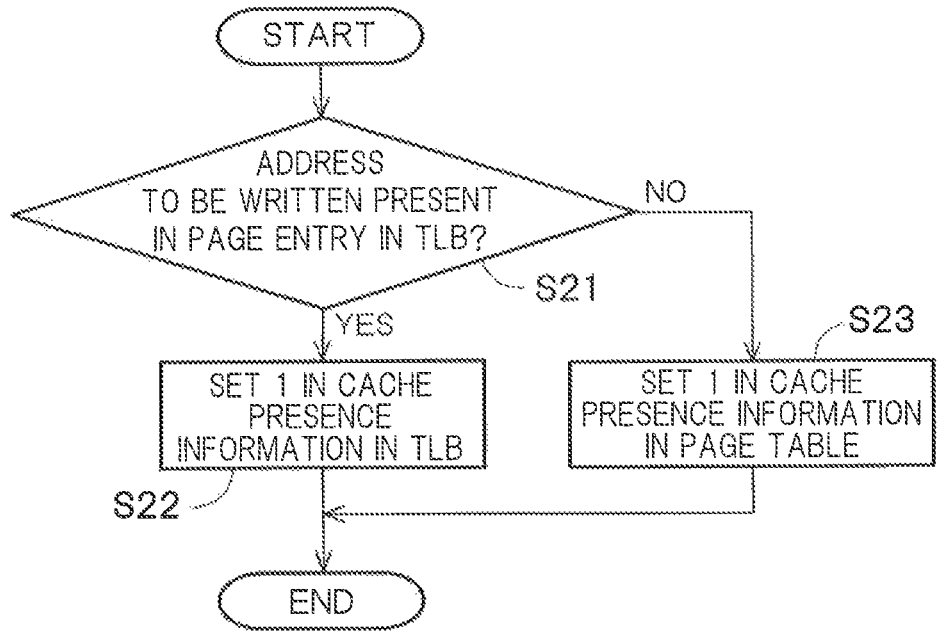
FIG. 5 is a flow chart showing an example of a process of updating cache presence information 20 in the case of storing data in a L4-cache 9.

FIG. 5 is a flow chart showing an example of a process of updating the cache presence information 20 in the case of storing data in the L4-cache 9. The MMU 3 checks whether an address at which a cache miss occurs or an address of data sent from a lower-layer cache memory or the main memory 10 is present in a page entry in the TLB 4 (Step S21).

If YES in Step S21, a bit in the cache presence information 20 in the TLB 4, for the corresponding cache line, is set to 1 (Step S22). If NO in Step S21, by looking up to the page table 5, a bit in the cache presence information 20 in the page table 5, for the corresponding cache line, is set to 1 (Step S23).

Figure 6:
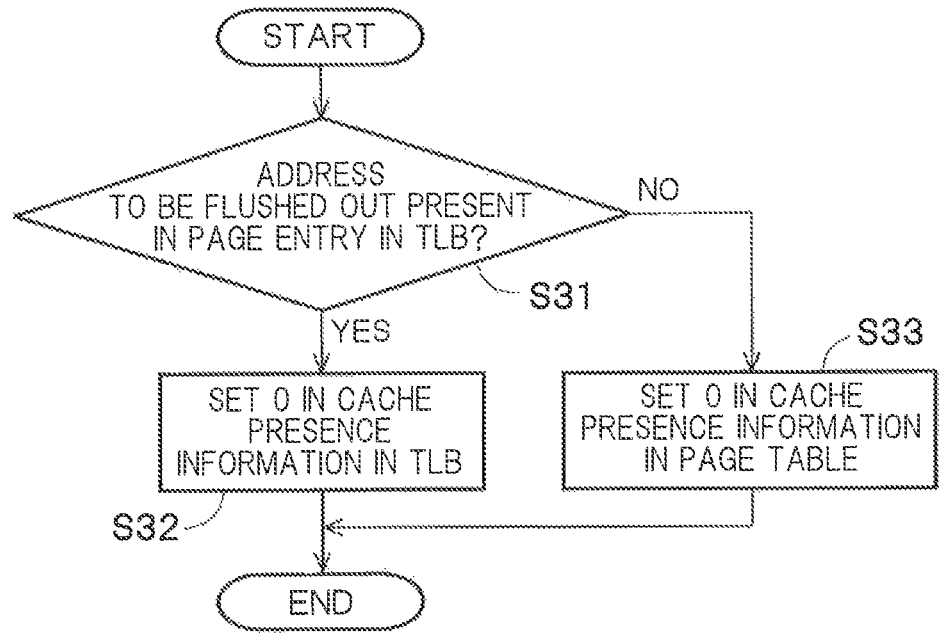
FIG. 6 is a flow chart showing an example of a process of updating the cache presence information 20 in the case of flushing out data from the L4-cache 9.

FIG. 6 is a flow chart showing an example of a process of updating the cache presence information 20 in the case of flushing out data from the L4-cache 9. The MMU 3 checks whether an address at which a cache miss occurs or an address of data sent from a lower-layer cache memory is present in a page entry in the TLB 4 (Step S31).

If YES in Step S31, a bit in the cache presence information 20 in the TLB 4, for the corresponding cache line, is set to 0 (Step S32). If NO in Step S31, by looking up to the page table 5, a bit in the cache presence information 20 in the page table 5, for the corresponding cache line, is set to 0 (Step S33).

The cache presence information updating method has been explained so far. There are a variety of variations in what is updated and updating policy. For example, in an embodiment in which the cache presence information is stored in the TLB 4 and the page table 5, the cache presence information stored in the TLB 4 may only be updated in the case where data stored in the L4-cache 9 is updated (in this case, for example, the page table 5 may be updated when data is flushed out from the TLB 4). For example, in an embodiment in which the cache presence information is stored in the TLB 4, if there is no corresponding data in the TLB 4 in the case where data stored in the L4-cache 9 is updated, the cache presence information may not be updated. In this case, due to the inconsistency between data allocated in the L4-cache 9 and the cache presence information, there is a possibility of erroneous determination of False positive, False negative, etc., in access determination to the L4-cache 9 using the cache presence information. The measures against the erroneous determinations will be explained later.

(Variation in Method of Storing Cache Presence Information 20)

In the embodiment described above, the TLB 4 is a 1-layer page entry cache for simplicity. However, the present embodiment is applicable to a multi-layer TLB 4. In this case, the simplest cache-presence information storing method is to store the information in all layers. There is also a method of allocating the cache presence information 20 in part of layers. For example, there is a method of allocating the cache presence information 20 in the lowest-layer TLB 4. With such methods, access to the TLB 4 is dispersed to physically different memories, so that delay due to access collisions to the TLB 4 can be reduced. A typical example that gives this effect is as follows. The TLB 4 is looked up to due to memory access from the CPU2. The TLB 4 is also looked up to for updating the cache presence information 20 in accordance with change in data allocated in the L4-cache 9. If the TLB 4 is looked up to at the same timing for the above two purposes, access collisions can be avoided by looking up to an upper-layer TLB 4 for the former purpose and to a lower-layer TLB 4 for the latter purpose.

(Variation in Format of Cache Presence Information 20)

In the embodiment described above, the cache presence information 20 has a 1-bit flag for each cache line. However, the cache presence information 20 is not limited to have such a format.

For example, the cache presence information 20 may have more detailed information. For example, the cache presence information 20 may have every address per line or a memory bank ID having a storage area provided per line for storing each line.

Moreover, the cache presence information 20 may have a bit string of one or more bits of compressed information of all cache lines in a specific cache memory (such as the L4-cache 9), which are included in one page, for each page entry of the TLB 4. As an example, there is a method of information compression using a hash function. There are variety of hash functions. One variation is, for example, to store the number of lines present in the L4-cache 9 among the lines in a page. Another variation is to make hush data by a logical OR of line addresses present in the L4-cache 9.

In the case where information compressed with a hash function is used as the cache presence information 20, it should be noted that correct determination of whether there is data in the L4-cache 9 or not cannot be performed only with the information. Erroneous determinations caused by the use of information compressed with the hash function are False positive and False negative. When False positive occurs, unnecessary access to the L4-cache 9 is performed, and performance is lowered due to unnecessary tag access. However, there are no adverse effects to the result of program execution, hence not so problematic. Likewise, when False negative occurs, as long as the L4-cache 9 is in a write-through mode, although there is an occasion where the L4-cache 9 cannot be effectively used, the problem is only reduction in performance, which is not so problematic. On the contrary, when the data allocation policy is write-back, there is a possibility that the latest data (data having a correct value) is present only in the L4-cache 9, data (an erroneous value), which is not the latest, may be used for calculation. In such a case, the following additional control may be performed, for example. The cache presence information 20 and the Dirty bit of a page entry are looked up to and, when the Dirty bit has been set, the L4-cache 9 is accessed irrespective of the cache presence information 20.

(Variation in Method for Storing Cache Presence Information 20 in Cooperation with Another Hardware Module)

It is possible in the present embodiment that information in page entries can be reduced by cooperating with another hardware module. An example here is what is recorded in the page entries is only the number of data lines present in the L4-cache 9. If the control policy is to access the L4-cache 9 when the number of data lines present in the L4-cache 9 is zero or more, False positive occurs at high probability. This problem can be restricted by the following method, for example. A hardware module of bit vectors with which lines in each page can be identified is additionally installed. The hardware module is looked up to in the case where the number of data lines present in the L4-cache 9 is zero or more when looking up to a page entry (of the TLB 4 or the page table 5). Therefore, it is possible to determine the necessity of accessing the L4-cache 9 at high accuracy, while restricting the number of bits necessary for the cache presence information 20 in the TLB 4 or the page table 5.

In the embodiment described above, there are 4-layer (L1- to L4-caches 6 to 9) cache memories. However, the number of cache memory layers is not limited to four. Moreover, the cache memory having the cache presence information 20 is not limited to the L4-cache 9. The cache presence information 20 may be provided for each cache memory of at least one layer. In this case, identification information, that indicates which layer of cache memory corresponds to each cache presence information 20, may be set in the page entry information 11 of FIG. 3. Moreover, the cache presence information 20 of cache memories of at least two layers higher may be combined into one piece of information.

As described above, in the present embodiment, the cache presence information 20, that indicates whether data of a virtual address issued by the processor 2 is stored in a specific cache memory of at least one layer higher, is stored in at least either one of the TLB 4 and the page table 5. Therefore, before accessing a tag memory of the specific cache memory, whether there is data in the cache memory can be predicted with the cache presence information 20. Therefore, it is possible to access the main memory 10 at a higher speed than to access the main memory 10 after waiting for the result of a cache miss by accessing the tag memory although there is no target data in the cache memory. It is also possible to reduce power overhead due to unnecessary access to the tag memory. In other words, a cache memory is not accessed when it is predicted with the cache presence information 20 that there is no target data in the cache memory, hence performance and power overhead at the time of a cache miss can be reduced.

The cache presence information 20 in the present embodiment gives a large effect when it is stored in a large-capacity cache memory such as the L4-cache 9. In the case of large-capacity cache memories, accessing a tag memory takes time, so that accessing the main memory 10 after knowing a cache miss takes extra time. In contrast, with the cache presence information 20 stored, before accessing the tag memory of a cache memory, it is correctly predicted whether there is target data in this cache memory. Therefore, it is possible to access the tag memory only when it is predicted that there is target data, so that it is possible to access the main memory 10 at a higher speed in the case of a cache miss, thus improving access efficiency. Larger-capacity cache memories require a larger-capacity tag memory which requires larger power for accessing. With correct accessing, the power for accessing can also be reduced.

Each embodiment has been described with MRAM cells as the memory cells of the L4-cache 9. The cache memories of the present embodiment may, however, be other non-volatile memories (such as ReRAM (Resistance RAM) memory cells, PRAM (Phase Change RAM), FRAM (Ferroelectric RAM, a registered trademark), or NAND flash memories). Volatile memories, such as SRAM or DRAM, may also be used.

The above embodiment has been described with the cache presence information 20 stored in at least either one of the TLB 4 and the page table 5, with which a hit/miss in accessing a specific memory is determined to avoid unnecessary access to a tag memory. Other than the embodiment, the cache presence information 20 can be used for other purposes.

(Example of Use of Cache Presence Information in Power Control)

The cache presence information 20 stored in at least either one of the TLB 4 and the page table 5 may, for example, be used in cache-memory power management. As an example, when the L4-cache 9 is accessed few times, the L4-cache 9 is put into a low-power consumption mode in which the L4-cache 9 is cut off from power or supplied with a lowered power voltage, to reduce power consumption. In general, there are temporal and power overhead in transition from the low-power consumption mode to a data accessible state (an active mode). In detail, it takes a certain time to move from a power-cut state to a data accessible state, with power being consumed. Accessing the L4-cache in the low-power consumption mode requires a recovery time from the power-cut to the active mode, which leads to performance degradation of the processor 2, in addition to usual cache latency. When the active mode is used often, unnecessary power is consumed even if the L4-cache 9 has no data.

One way to solve the above problem is to use the cache presence information 20 to 1) determine a hit/miss in the L3-cache 8 to predict (determine) access to the L4-cache 9, and also to 2) determine a hit/miss in the L4-cache 9. If the determination of a hit/miss in the L3-cache 8 in 1) is possible, transition from the low-power consumption mode to the active mode can be made before accessing the L4-cache 9, to cover up overhead in mode transition. Moreover, if a hit/miss in the L3-cache 9 is determined, the low-power consumption mode can be shifted to the active mode only when there is a hit in the L4-cache 9, to restrict unnecessary mode transition.

Figure 7:
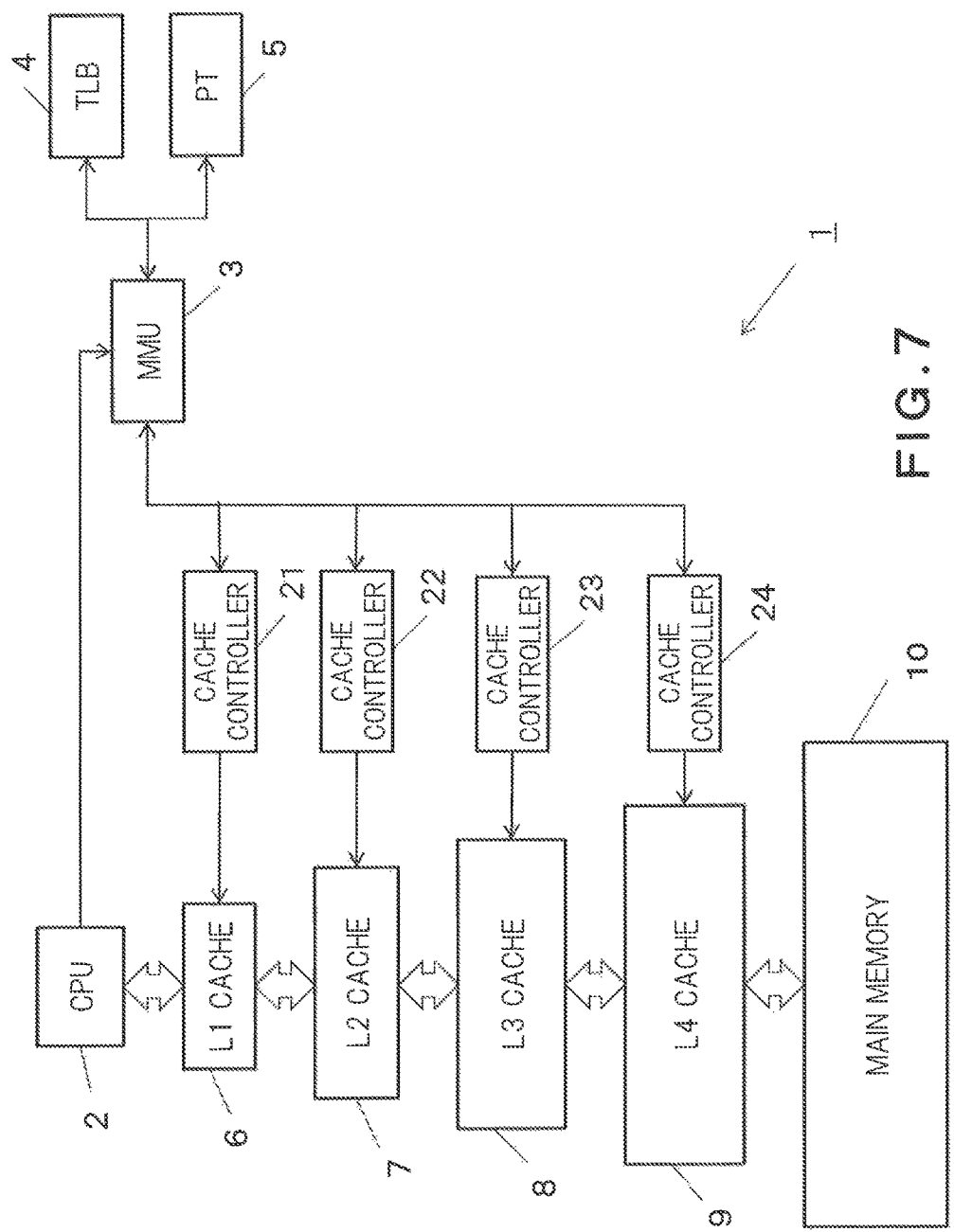
FIG. 7 is a block diagram schematically showing the configuration of a processor system 1 using the cache presence information 20 for power control.

FIG. 7 is a block diagram schematically showing the configuration of a processor system 1 using the cache presence information 20 for power control. The processor system 1 of FIG. 7 is provided with cache controllers 21 to 24 respectively associated with cache memories 6 to 9 of respective layers. The cache controllers 21 to 24 control access and power to the corresponding cache memories 6 to 9 in accordance with instructions from the MMU 3. For example, based on the cache presence information 20, the MMU 3 determines whether to access L4-cache 9 depending on whether there is a L3-cache miss and controls power to be supplied to the L4-cache 9 depending on whether to access the L4-cache 9. In this way, when the L4-cache 9 is not accessed, the L4-cache 9 can be operated in the low-power consumption mode to reduce power consumption. When a hit in the L4-cache 9 is expected, the L4-cache 9 is put into the active mode before starting actual access, thereby achieving high-speed access.

(Example of Use of Cache Presence Information in Dead Line Control)

The cache presence information 20 allocated in at least either one of the TLB 4 and the page table 5 can, for example, be used in identification of a dead line. The dead line is a cache line which has a low possibility of being used in future. The dead line is, for example, data that has been used by a released process. Storage of a cache line which has a low possibility of being used causes reduction in cache-memory use efficiency.

The above problem can be solved by, for example, identifying a page of a released process with at least one of the TLB 4 and the page table 5. If it is found that data of the page is included in a specific cache based on cache presence information 20, the data may be invalidated. In this way, it is prevented from occurring that, due to continuously storing data which is not used in future, data having a possibility of being used in future is flushed out. Therefore, cache memories can be effectively used.

A processor system 1 with the cache presence information 20 for use in dead-block control can be realized, for example, with the same circuit block as that of FIG. 7. There are two methods as follows for memory management in the case of process switching by the processor 2. One method is to completely rewrite (flush out) the TLB 4 when the processor 2 releases a process. In this case, the MMU 3 notifies that all data stored in the TLB 4 have been invalidated to a cache controller of each cache based on the cache presence information 20 stored in the TLB. Given the notification, the cache memories 6 to 9 of respective layers invalidate the corresponding data in succession. The other method is that the TLB 4 or the page table 5 stores identification information with which each process is identifiable. The MMU 3 acquires identification information corresponding to a released process and notifies the identification information to the cache controller 21 of each cache 6. Given the identification information, the cache memories 6 to 9 of respective layers invalidate data corresponding to the identification information based on the cache presence information 20 stored in the TLB.

(Example of Use of Cache Presence Information in NUCA Effective Control)

The cache presence information 20 allocated in at least either one of the TLB 4 and the page table 5 can also be used, for example, efficient access in NUCA (Non-uniform cache access). The NUCA is a cache system in which a cache of a layer is divided into several areas (banks) which are accessed from a location (for example, CPU) at different latency times. This system is used, especially, for efficient use of a large-capacity cache. The large-capacity cache tends to have a long latency time. However, high-speed access is achieved with the use of NUCA when the large-capacity cache has data located close to a subject from which access is made. An example of the use of NUCA is shown below. A multicore processor has a bank (local bank) for each core and a tag section for each bank. It is supposed that a core accesses a local bank which has no data. In this case, it is determined with coherent access whether another bank has data. Even if the other bank has data, there are latency and power overhead for access and coherency to the local bank.

As a method of solving such overhead, for example, bank ID information on a bank that stores cache line data may be included in the cache presence information 20. With this method, a bank having data can be identified when access is made to at least either one of the TLB 4 and the page table 5, and hence overhead in access to a bank with no data and in coherency can be avoided. The bank ID information may be hash information like explained in the above first embodiment.

Figure 8:
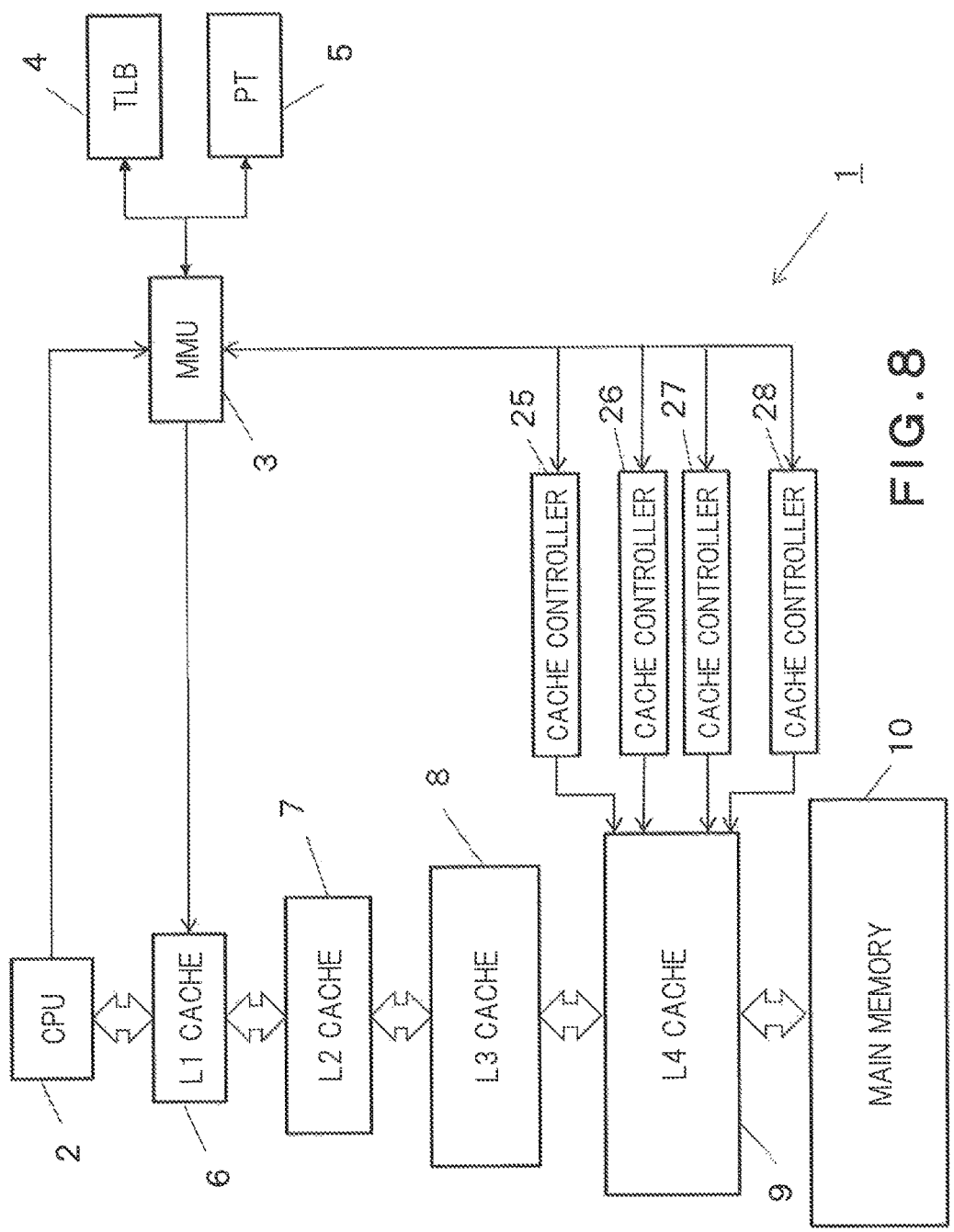
FIG. 8 is a block diagram schematically showing the configuration of a processor system that performs NUCA.

FIG. 8 is a block diagram schematically showing the configuration of a processor system that performs the NUCA. In the example of FIG. 8, the L4-cache 9 is divided into four memory banks. There are cache controllers 25 to 28 for the memory banks, respectively. Each of the cache controllers 25 to 28 notifies the MMU 3 of data stored in the corresponding memory bank, together with memory bank ID information. The MMU 3 registers the received information in the TLB 4 and the page table 5. Therefore, by looking up to the TLB 4 or the page table 5, the MMU 3 can quickly know which memory bank has stored data to which an access request is made by the processor 2. In this way, the MMU 3 can access at a high speed the memory bank that has stored the data.

Although several embodiments of the present invention have been explained above, these embodiments are examples and not to limit the scope of the invention. These new embodiments can be carried out in various forms, with various omissions, replacements and modifications, without departing from the conceptual idea and gist of the present invention. The embodiments and their modifications are included in the scope and gist of the present invention and also in the inventions defined in the accompanying claims and their equivalents.

The invention claimed is:

1. A cache memory system comprising:
    cache memories of at least one layer, at least one of the cache memories comprising a data cache to store data and a tag to store an address of data stored in the data cache; and
    a first address conversion information storage to store entry information that comprises address conversion information to convert virtual addresses issued by a processor to physical addresses and cache presence information that indicates whether data corresponding to the converted physical address is stored in a specific cache memory of at least one layer among the cache memories, and to update the cache presence information when data stored in the specific cache memory is updated.

2. The cache memory system of claim 1, wherein the first address conversion information storage updates the cache presence information in at least either a case of writing new data in the specific cache memory or a case of flushing out data stored in the specific cache memory.

3. The cache memory system of claim 1 further comprising a memory management unit to access a cache memory at a higher level than the specific cache memory or to access a main memory, without accessing the tag of the specific cache memory, when it is determined with the cache presence information that there is no data in the specific cache memory.

4. The cache memory system of claim 1 further comprising a memory management unit, when looking up to the entry information in response to an access request from the processor, to acquire the cache presence information.

5. The cache memory system of claim 1, wherein the specific cache memory is a highest-level cache memory.

6. The cache memory system of claim 1, wherein the specific cache memory comprises an MRAM (Magnetoresistive RAM) cell.

7. A cache memory system comprising:
    cache memories of at least one layer, at least one of the cache memories comprising a data cache to store data and a tag to store an address of data stored in the data cache;
    a first address conversion information storage to store entry information that comprises address conversion information to convert virtual addresses issued by a processor to physical addresses and cache presence information that indicates whether data corresponding to the converted physical address is stored in a specific cache memory of at least one layer among the cache memories;

a second address conversion information storage to store the entry information and the cache presence information that are stored in the first address conversion information storage, and the entry information and the cache presence information that are not stored in the first address conversion information storage; and a memory management unit, when accessing a physical address that is not present in the entry information of the first address conversion information storage, to look up to the cache presence information stored in the second address conversion information storage to determine whether to access the specific cache memory.

8. The cache memory system of claim 7, wherein, when updating at least a part of the entry information stored in the first address conversion information storage to another entry information, the memory management unit writes back the entry information and the cache presence information before being updated, to the second address conversion information storage.

9. A cache memory system comprising:

cache memories of at least one layer, at least one of the cache memories comprising a data cache to store data and a tag to store an address of data stored in the data cache;

a first address conversion information storage to store entry information that comprises address conversion information to convert virtual addresses issued by a processor to physical addresses and cache presence information that indicates whether data corresponding to the converted physical address is stored in a specific cache memory of at least one layer among the cache memories; and a cache controller to control power to be supplied to the specific cache memory according to whether to access the specific cache memory based on the cache presence information.

10. The cache memory system of claim 1 further comprising a cache controller to determine, based on the cache presence information, whether data to be used by a process released by the processor is stored in the specific cache memory, and to invalidate the data determined to be stored in the specific cache memory.

11. The cache memory system of claim 1, wherein the specific cache memory is divided into a plurality of banks, the cache presence information comprises bank identification information that indicates, in which bank in the specific cache memory, data is stored, further comprising a cache controller to access a bank corresponding to the bank identification information in the cache presence information when accessing the specific cache memory.

12. The cache memory system of claim 1, wherein the cache presence information comprises information for each cache line in the specific cache memory.

13. The cache memory system of claim 12, wherein, for each entry of the first address conversion information storage, the cache presence information comprises a bit string of one or more bits of compressed information of all cache lines of the specific cache memory.

14. The cache memory system of claim 12, wherein, for each entry of the first address conversion information storage, the cache presence information is provided on a one-bit basis for each of all cache lines of the specific cache memory.

15. A processor system comprising:

a processor;

cache memories of at least one layer, at least one of the cache memories having a data cache to store data and a tag to store an address of data stored in the data cache; and a first address conversion information storage to store entry information that comprises address conversion information to convert virtual addresses issued by a processor to physical addresses and cache presence information that indicates whether data corresponding to the converted physical address is stored in a specific cache memory of at least one layer among the cache memories, and to update the cache presence information when data stored in the specific cache memory is updated.

16. The processor system of claim 15, wherein the first address conversion information storage updates the cache presence information in at least either a case of writing new data in the specific cache memory or a case of flushing out data stored in the specific cache memory.

17. The processor system of claim 15 further comprising:

a second address conversion information storage to store the entry information and the cache presence information that are stored in the first address conversion information storage, and the entry information and the cache presence information that are not stored in the first address conversion information storage; and a memory management unit, when accessing a physical address that is not present in the entry information of the first address conversion information storage, to look up to the cache presence information stored in the second address conversion information storage to determine whether to access the specific cache memory.

18. The processor system of claim 17, wherein, when updating at least a part of the entry information stored in the first address conversion information storage to another entry information, the memory management unit writes back the entry information and the cache presence information before being updated, to the second address conversion information storage.

* * * * *